April 13, 1971     A. K. THORSRUD     3,574,783
CONTINUOUS HEAT-CURING OF MATERIALS
Filed March 30, 1967
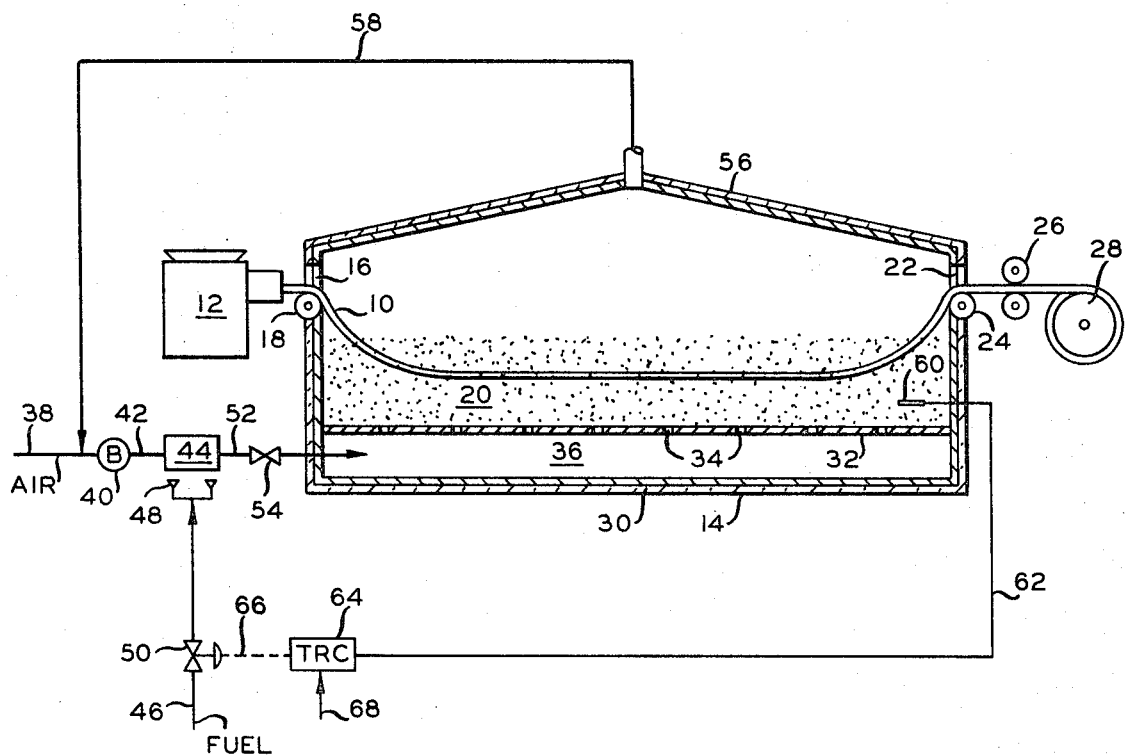
INVENTOR.
A. K. THORSRUD
BY    *Young & Quigg*
ATTORNEYS United States Patent Office 3,574,783
Patented Apr. 13, 1971

3,574,783
CONTINUOUS HEAT-CURING OF MATERIALS
Agmund K. Thorsrud, Madrid, Spain, assignor to Phillips Petroleum Company
Filed Mar. 30, 1967, Ser. No. 627,185
Int. Cl. C08c 17/28
U.S. Cl. 260—812                          7 Claims

ABSTRACT OF THE DISCLOSURE

A method for the continuous heat-curing of materials by passing same through a fluidized, heated layer of small particles of fluorocarbon resins; the apparent density of the fluidized particles being equal to or less than the density of the material being cured.

---

This invention relates to a method for the continuous heat-curing of materials. In another aspect, this invention relates to a method for the continuous heat-curing of rubber extrudates wherein fluidized solid particles are used as the heating medium.

In the manufacture of some products, it is desirable to heat-cure the unfinished product at various stages of processing to obtain favorable physical and chemical properties. In the production of rubber product, heat-curing is used extensively, e.g. vulcanization of rubber extrudates. The most widely used method for vulcanizing extruded rubber products is the standard autoclave method. This method has limitations and is undesirable for some applications. The length of the extrudate which can be cured is substantially limited to the length of the autoclave pans. Unless curing forms are used for extrudates with thin walls, such as tubing, they tend to collapse and distort from their own weight in the autoclave during curing. When talc or other materials are used to prevent the extrudate from sticking to the apparatus, unattractive surfaces result. A steam cure, used sometimes to preclude the use of talc, gives dull extrusion surfaces. To compensate for shrinkage during curing, the extrudates to be cured in an autoclave are often cut to oversize lengths and then cut to the exact size after curing with resultant scrap.

To overcome these disadvantages of the autoclave method, a variety of continuous vulcanization methods have been developed, including: hot air vulcanization, open steam curing and liquid curing; the last method being the most widely used of these. Continuous curing methods eliminate handling required in cutting extrudates and loading and unloading autoclaves. They also eliminate scrap since the product can be cut to the exact size after curing. Also, when various usages of the product require the same extrudate in different lengths, reels of cured extrudate can be stored for use as needed.

The liquid curing method is especially useful in the production of extrudates with considerable length, where close dimensional tolerances are required, where complex cross sections must be cured without collapse of thin walls or.without distortion, and where glossy surfaces are desired. Most liquid curing methods have the additional advantages of excellent heat transfer efficiency, low resistance to drag as the extrudate is being moved through the curing medium, and curing medium densities less than the extrudates so that it will remain submerged in the curing medium while passing therethrough.

Generally, two major types of curing media are used for liquid curing; organic oils such as polyalkylene glycol and eutectic salts such as a mixture of potassium nitrate, sodium nitrate and sodium nitrite. Although the organic oils produce glossy surfaces with most rubbers and are relatively inexpensive, generally, they cannot be used for sponge because they produce a porous surface. Also there is considerable loss of the medium in evaporation and carry off as the cured extrudate is removed from the curing vessel. The eutectic salts produce good sponge and glossy surfaces for many rubbers, but give a dull finish to some rubbers and present a fire hazard. Eutectic salts will support combustion of some rubbers at normal curing temperatures and the fire cannot be extinguished until the rubber extrudate is consumed. Both of these curing media require a washing step after curing to remove material deposited on the extrudate and can contaminate some rubber products.

Liquid curing with molten metals, such as bismuth-tin alloys, has also been used. Although the molten metals can be used for high curing temperatures, the high density of the medium requires some mechanism for maintaining the extrudate submerged in the heating medium with resultant distortion. In addition, this medium produces vulcanizates with unattractive surfaces and requires a precoating of dust or oil which must be washed off after curing.

Accordingly, an object of this invention is to provide a method for continuous heat-curing of rubber extrudate which produces a product with a glossy surface, which requires no coating on the extrudate prior to curing, and which substantially eliminates adherence of the heating medium to the cured product.

Another object is to provide a method for continuous heat curing of rubber extrudates wherein the friction between the heating medium and the extrudate passing therethrough is minimized and the heating medium is chemically inert relative to the product being cured.

Still another object is to provide a method for heat-curing rubber extrudates in which the extrudate is uniformly heated and the apparent density of the heating medium can be controlled so that the extrudate will remain submerged in the medium from its own mass; hence, minimizing distortion during curing.

A further object is to provide a method for heat-curing rubber extrudates which are free from a fire hazard.

Additional objects, aspects and advantages of the invention will become apparent to those skilled in the art from the following detailed description, drawing, and appended claims.

According to my invention, the rubber extrudate is heat-cured by passing same through a vessel containing a heating medium comprising finely divided particles of fluorocarbon resins which are fluidized by the upward pressure of gas flowing through the medium. The particles, which are suspended in the gas stream, behave much like a fluid so that the heat transfer to the extrudate passing therethrough is much the same as heat transfer from a liquid. The particles are heated by a heating means, such as electrical resistance heaters located in the fluidized particles, by heating the vessel containing the particles, or by heating the gas which is used to fluidize the particles.

This method of curing rubber extrudate includes advantages of liquid curing, such as excellent heat transfer efficiency, low resistance to drag, and medium densities which allow the extrudate to be submerged by its own mass, and has the additional advantages of the elimination of the necessity for after-treatment to remove heating medium adhering to the surface of the cured product, elimination of a fire hazard, and elimination of possible contamination of the extrudate surface.

Particles of fluorocarbon resins as the heating medium of this invention provide these advantages because of their chemical inertness (eliminates any problem of contamination to the surface of the extrudate), their resistance to high temperatures (provides capability of relatively high curing temperatures), their low coefficients of friction (minimizes drag, and therefore deformation, as the extrudate is being passed through the medium), their non-flammability (eliminates fire hazard problem), and their anti-stick or non-adhesive characteristics (eliminates the necessity for removing heating medium from the cured product or the carry off of heating medium).

The fluorocarbon resins which can be used with this invention include polytetrafluoroethylene, fluorinated ethylene propylene, polychlorotrifluoroethylene, and polyvinylidene fluoride and the like.

Polytetrafluoroethylene, hereinafter referred to as PTFE, is essentially chemically inert, being affected only by molten alkali metals and elemental fluorine, and can be used continuously at temperatures as high as 500° F. with no effect on the chemical inertness and has an extremely low coefficient of friction. These properties make PTFE especially adaptable to this invention; therefore, this is the preferred fluorocarbon resin. Examples of commercially available PTFE are Teflon TFE supplied by E. I. Du Pont de Nemours & Co., Inc., and Halon TFE supplied by Allied Chemical Corp.

Fluorinated ethylene-propylene, hereinafter referred to as FEP, is a copolymer of tetrafluoroethylene and hexafluoropropylene and has nearly the same properties as PTFE as far as use in this invention is concerned. It can be used continuously at temperatures as high as 400° F. Teflon FEP supplied by E. I. Du Pont de Nemours & Co., Inc. is a typical commercially available FEP.

Polychlorotrifluoroethylene, hereinafter referred to as CTFE, and polyvinylidene fluoride, hereinafter referred to as $VF_2$, have many properties similar to PTFE as far as use with this invention is concerned with somewhat lower operating temperature limit. Neither should be used where curing temperatures are in excess of about 300° F. Included in the CTFE class are CTFE copolymers modified with small amounts of vinylidene fluoride and other fluorine containing monomers. A typical commercially available CTFE is KEL–F 81 supplied by Minnesota Mining & Mfg. Co. and Kynar supplied by Pennsalt Chemical Corp. is a typical commercially available $VF_2$.

The choice of the gas used to fluidize the fluorocarbon resin particles depends to some extent upon the type of material being cured. For instance, with rubbers where there is no danger of oxidation, air, in addition to any gases which are chemically inert with the extrudate, such as nitrogen, can be used. With rubbers which could be oxidized by the gas, dry, superheated steam or other non-oxidizing gases must be used.

The pressure of the gas required to fluidize the particles depends upon the specific fluorocarbon resin used, the particle size and the depth of the bed of particles. To obtain fluidization, the product of the pressure drop of the gas through the particles multiplied by the cross-sectional area of the vessel must be equal to or greater than the weight of the particles in the vessel.

In order to obtain uniform fluidization of the particles, and therefore uniform heating of the material as it passes through the particles, the bottom of the vessel containing the particles must have some means for diffusing the gas passing upward through the particles. A diffusion plate containing a plurality of orifices smaller than the diameter of the particles and uniformly distributed over the surface can be used.

For a better understanding of the invention, reference is made to the drawing. The embodiment shown is adapted to curing continuous lengths of a rubber extrudate 10, such as rubber hose. Vulcanizable rubber extrudate 10 is delivered continuously from an extruder 12 into an elongated vessel 14, having a generally rectangular cross section, through inlet opening 16 and passing over idler roller 18. The extrudate 10 is passed through PTFE particles 20 in vessel 14. Particles 20, which are heated to the desired vulcanization temperature as described hereinafter, provide the heating medium for heat-curing or vulcanizing the extrudate. Extrudate 10 is withdrawn from vessel 14 through outlet opening 22, passes over idler roller 24, between take-up rollers 26 and is wound onto reel 28 for storage, further processing, and the like. Vessel 14 is preferably constructed of sheet steel and is covered with an insulating material 30. Diffusion plate 32, mounted in the bottom portion of vessel 14, comprises the base to support the particles 20 and contains a plurality of small orifices 34, the diameter of which is smaller than the smallest diameter of the particles used. This small diameter is required to prevent plugging when the system is shut down. Any other diffusion means, such as a screen or porous ceramic, can be used.

Zone 36 defined by the diffusion plate 32 and the bottom portion of the vessel 14 provides a manifold for gas introduced into the lower portion of vessel 14 as described hereinafter. Air is introduced into conduit 38 and passes to a conventional blower 40 wherein the gas pressure is raised to the desired level. Blower 40 forces the air through conduit 42 to heater 44 wherein the gas is heated to the desired temperature required for curing. Heater 44 is shown as a gas burner type heater for purposes of illustration. Any other conventional heating means, such as a series of electrical heaters, is acceptable. Fuel gas is supplied through conduit 46 to burners 48 which provide the source of heat for heating the air passing through heater 44. Control valve 50 disposed in conduit 46 regulates the flow of fuel gas to the burners 48. As indicated previously, the particles can be heated by heaters immersed in the fluidized particles or by applying heat directly to vessel 14.

The heated air passes through conduit 52 and is introduced into the lower portion of the vessel. Valve 54 disposed in conduit 52 is adjusted to regulate the flow of heated air to vessel 14. The heated air flows into zone 36 and passes upward through orifices 34 in diffusion plate 32 to the particles 20. The air pressure is regulated by the speed of blower 40 and valve 54 to obtain the desired degree of fluidization or "boiling" of the particles. As shown in the figure, vessel 14 is provided with a collector or hood 56 through which the upward-flowing air passes and is returned, via conduit means 58, to blower 40 to be reused in the fluidization of the particles. This closed-circuit system minimizes the heating requirements since at least some of the heat is conserved in the recycled air. This return system can be insulated to minimize heat loss to the surroundings. If the cost of heating is not an important consideration, vessel 14 can be open at the top in which case the upward flowing air would exhaust to atmosphere. It is also within the scope of the invention to pass the effluent gas through a cyclone separator or series of separators (not shown) to recover any suspended particles of PTFE or similar heating medium. Such particles can be either returned to the bed or discarded, depending on the size.

As discussed above, the gas or air pressure and its flow rate required to suspend the particles in the gas stream must be high enough so that the product of the pressure drop through the layer of particles multiplied by the cross-sectional area of the vessel 14 is at least equal to the weight of the PTFE particles 20 on diffusion plate 32. The static layer of the small particles will act much like a liquid before fluidization so their pressure on diffusion plate 32 is analogous to hydrostatic pressure, i.e. the pressure depends upon the depth of the static layer of particles and increases linearly with depth. This means that a greater pressure will be required to initiate fluidization than to maintain fluidization after it has once been established. Valve 54 is initially adjusted to give this required higher pressure to initiate fluidization. After fluidization of the layer of particles is obtained, valve 54 is adjusted to maintain a stable fluidized bed. The gas flow rate is adjusted so that the apparent density of the layer of particles is less than the density of the extrudate being cured, i.e., as the air space is increased by additional gas flow the apparent density of the layer of fluidized particles decreases. This reduced apparent density allows the extrudate to be submerged in the fluidized particles from its own mass. A gas flow in the range of about 100 to 1000 cubic feet per hour per each square foot of the base of the vessel will provide an adequate degree of fluidization for most vulcanizable rubber extrudates which can be cured by this invention. For instance, if a rubber extrudate having a density of 1.5 grams per milliliter is cured with PTFE particles, having a density of 2.2 grams per milliliter, as the heating medium, an air space representing at least 32 percent of the total volume of the fluidized bed is required so the extrudate will be submerged in the layer of particles.

The particle size can be varied over a wide range; however, there are practical limitations. The particles cannot be so small that they are powdery or else they would tend to be purged from the vessel by the gas flow during fluidization. Also, extremely small particles would necessitate that the orifices in the diffusion plate be so small that an excessive pressure drop across the plate would result. To insure sufficient heat transfer from the heated particles to the extrudate, the particles must be small enough to obtain adequate surface contact with the extrudate. Although not limited thereto, a preferred range of particle size is from 5 to 325 mesh (U.S. sieve).

The uniformity of fluidization, and therefore the uniformity of heat transfer to the extrudate, is influenced significantly by particle shape and surface. For this reason the shape of the particles should be regular and the particle size, for any particular operation, should be over a relatively narrow distibution; spherical particles wtih nearly identical diameters are preferred.

Generally, any material which can be heat-cured and is adaptable to continuous curing can be used in this invention. The primary limitation is the upper curing temperature which can be used. The fluorocarbon resins have upper operating temperature limitations as discussed previously. The temperature of the fluidized layer, which may vary with the rate that the extrudate is pulled through the layer of particles, can be controlled as shown in the drawing. Thermocouple 60 is disposed in the fluidized particles and senses the temperature therein. Thermocouple 60 is connected via signal line 62 to temperature recorder-controller 64, which is operatively connected by means indicated by control line 66, with valve 50. Controller 64 manipulates valve 50 in accordance with set point 68 which is set at the desired curing temperature level. As the temperature of the fluidized particles varies from this set point, a greater or less quantity of fuel gas is supplied to burners 48 via conduit 46. To obtain a temperature measurement representative of the average temperature of the fluidized particles, a plurality of thermocouples can be used with the control system as descibed above.

The dwell time of the extrudate in the fluidized particles can be varied by the length of the vessel and the speed of rotation of the take-up rollers 26. The length of the vessel may vary from a few feet to several feet dependent upon the extrudate being used. The speed of the take-up rollers, i.e., the speed at which the extrudate is towed through the fluidized particles, is governed somewhat by the extruder delivery rate. The maximum rate of extrusion will be that at which adequate curing can be achieved in the vessel.

For some materials it may be desirable to pass them through the fluidized layer of particles more than one time to obtain the desired curing.

While the above description of the invention is directed to the curing of rubber extrudates, it is contemplated that the present invention can be employed to apply heat to any continuous, elongated articles of corresponding materials to cure them accordingly. For example, resin-bonded fiberglass articles can be heated by the method of this invention to cure the resin to obtain the optimum decomposition rate of the catalyst employed and thereby obtain the most favorable chemical linkage in the resin and the maximum physical properties in the article.

Reasonable variations and modifications are possible within the scope of this disclosure without departing from the spirit and scope thereof.

I claim:
1. A method for continuous heat-curing of vulcanizable rubber comprising:
    (a) heating a layer of small particles of a fluorocarbon resin selected from the group consisting of polytetrafluoroethylene, fluorinated ethylene-propylene copolymer, polychlorotrifluoroethylene and polyvinylidene fluoride to an elevated temperature in a curing zone, the temperature of said particles being sufficient to cure a heat-curable vulcanizable rubber passed therethrough;
    (b) fluidizing said layer of particles by flowing a gas upward therethrough, the rate of flow and pressure of said gas being sufficient to make the apparent density of said layer of particles equal to or less than the density of said heat-curable vulcanizable rubber;
    (c) passing said heat-curable vulcanizable rubber through said fluidized particles, the residence time being sufficient to obtain the desired curing; and
    (d) withdrawing the cured rubber from said curing zone.
2. The method according to claim 1 wherein said heat-curable vulcanizable rubber is in the form of an extrudate.
3. The method according to claim 1 wherein said particles are heated by said fluidizing gas which has been heated prior to introduction into said curing zone.
4. The method according to claim 3 wherein said fluidizing gas is air, or superheated steam.
5. A method according to claim 2 wherein said particles are in the size range of 5 to 325 mesh.
6. The method according to claim 5 wherein said particles are spherically shaped.
7. The method according to claim 5 wherein said particles are polytetrafluoroethylene.

References Cited
UNITED STATES PATENTS
3,061,941  11/1962  Goy et al. ........... 260—812
3,061,943  11/1962  Bennett et al. ....... 260—812

OTHER REFERENCES

Hofmann, W., Vulcanization and Vulcanizing Agents, New York, Palmerton Publishing Co. Inc., 1967, pp. 65–66.

JOSEPH L. SCHOFER, Primary Examiner

J. A. DONAHUE, Jr., Assistant Examiner

U.S. Cl. X.R.

34—10; 260—79.5, 94.4